Jan. 17, 1967 N. BOTSFORD, JR 3,299,422

ELECTRICAL PULSE GENERATOR

Filed Dec. 24, 1963 2 Sheets-Sheet 1

INVENTOR
N. BOTSFORD, JR.
BY Herbert M. Shapiro
ATTORNEY

Jan. 17, 1967 N. BOTSFORD, JR 3,299,422

ELECTRICAL PULSE GENERATOR

Filed Dec. 24, 1963 2 Sheets-Sheet 2

United States Patent Office 3,299,422
Patented Jan. 17, 1967

3,299,422
ELECTRICAL PULSE GENERATOR

Nelson Botsford, Jr., Colts Neck, N.J., assignor to Bell Telephone Laboratories, Incorporated, New York, N.Y., a corporation of New York Filed Dec. 24, 1963, Ser. No. 333,149
5 Claims. (Cl. 340—347)

Figure 1:
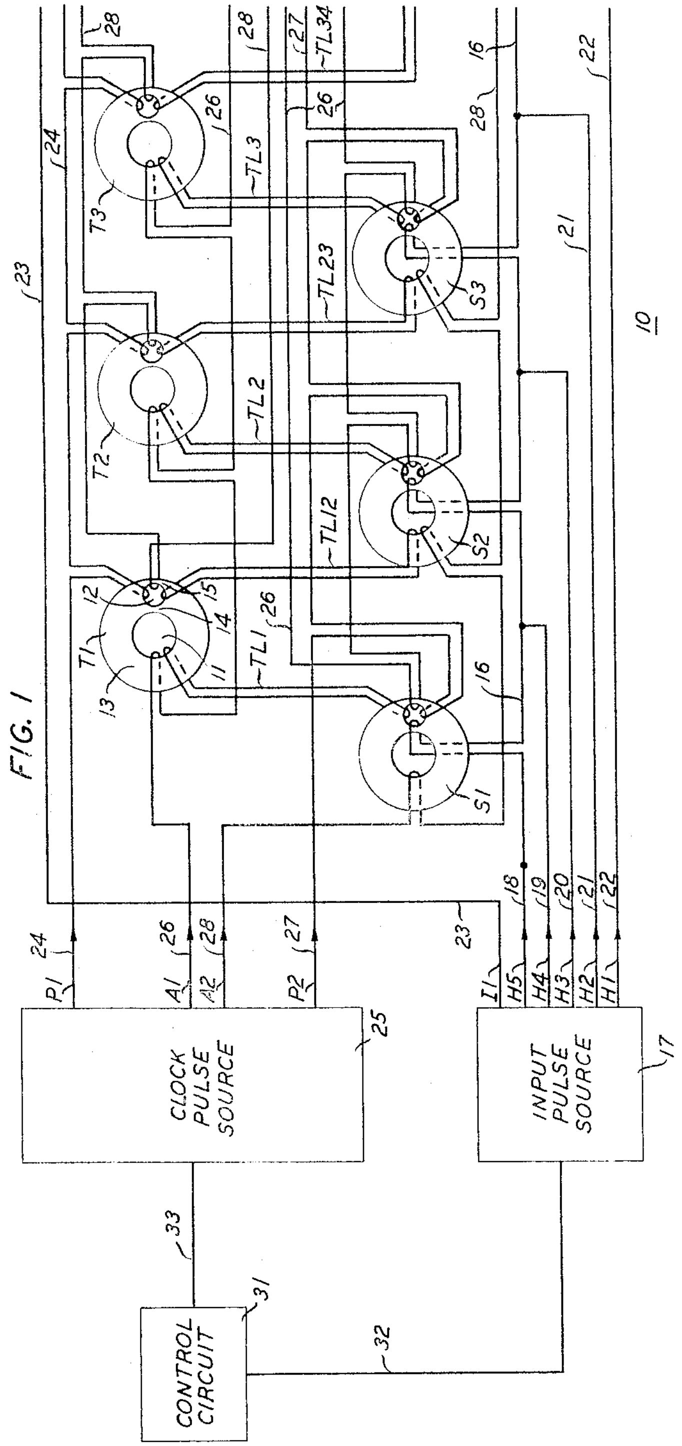

This invention relates to electrical signal generators and, more particularly, to dial pulse generators for use, primarily but not exclusively, in connection with telephone subscriber subsets. As there used, a signal generator is controlled by the subscriber to transmit coded series of electrical pulses representative of the directory designation of the distant subscriber substation with which a connection is desired.

At the present time, the electrical pulses are generated, primarily, by periodically interrupting a closed direct-current circuit by means of pulsing springs in the telephone subset. The springs are controlled by the familiar finger controlled telephone dial which is operated in accordance with the digital information of the called line to produce a series of direct-current pulses which operate, in one telephone system, to control mechanical switches which, in turn, establish the desired connection between the calling and the called lines. The rate at which the current pulses are delivered to the central office is about ten pulses per second; this pulse rate has been found optimum for operating the mechanical switches encountered in most central offices today.

An effort is currently under way to avoid the inherent wear of mechanical switches and to increase substantially the pulse rate in order to reduce maintenance costs and to permit fewer common switching circuits to accommodate a greater amount of traffic, respectively. This effort is being implemented, primarily, by the installation of electronic central offices. In keeping with this effort, the present telephone subscriber subsets are being replaced by the pushbutton type telephones which emit a coded multifrequency signal each time a pushbutton is depressed. Although these telephones are ideally suited for operation with the electronic central offices, they must also be made compatible with existing central offices which can handle directly neither the multifrequency signal output of the new pushbutton telephone nor the rate at which such signals are typically emitted.

In connection with the pushbutton telephones, it is current practice for a central office to receive the multifrequency signal by means of a multifrequency receiver which provides coded output pulses for introducing, directly, or, if necessary, via an intermediate buffer memory, a single set state into a corresponding single stage of a stepping switch. The set state is shifted through the stepping switch thereby generating an output pulse each time the set state is shifted. Such a system is described, for example, in Patent No. 2,933,563 of L. A. Hohmann, Jr., issued Apr. 19, 1960.

An object of this invention is to provide a new and novel pulse generator for translating coded input information into prescribed output pulse sequences.

A more specific object of this invention is to provide a pulse generator for translating one or two-out-of-six coded signals from the multifrequency receiver into prescribed output pulse sequences, compatible with, for example, a mechanical telephone central office.

The foregoing and other objects of this invention are realized in one illustrative embodiment thereof which comprises a multistage shift register including a storage and a transfer multiapertured core per stage in an arrangement of the type described in Patent No. 3,045,215 of U. F. Gianola, issued July 17, 1962. In accordance with this invention, a combinational input circuit couples all the storage cores and the transfer core of the terminal stage of the register in a manner to set, starting at the storage core of the terminal stage of the register, $n/2$ of the storage cores in response to a coded input signal corresponding to an even number $n$ and to set $n/2$ of the storage cores plus the transfer core of the terminal stage of the register in response to a coded input signal corresponding to an odd number $n+1$. Once the various cores are set, prime and advance pulses are applied alternatingly to the shift register in a four-phase cycle of operation essentially as described in the aforementioned Gianola patent. The corresponding number of output pulses are realized by means of an output conductor coupling the storage and transfer core of the terminal stage of the register for providing an output pulse in response to the resetting of either of the so coupled cores.

Thus, a feature of this invention is an input circuit coupled to the cores of a shift register in a manner to set the storage cores of $n/2$ stages in response to an input coded signal corresponding to an even number and to set the storage cores of $n/2$ stages plus the transfer core of the terminal stage of the register in response to an input coded signal corresponding to an odd number $n+1$.

Another feature of this invention is an output circuit coupling the storage core and transfer core of the terminal stage of the register for providing a pulse therein in response to the resetting of either of the so coupled cores.

Figure 4:
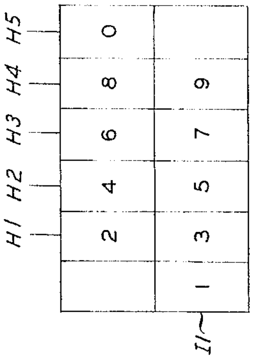
Figures 3A, 3B, 3C:
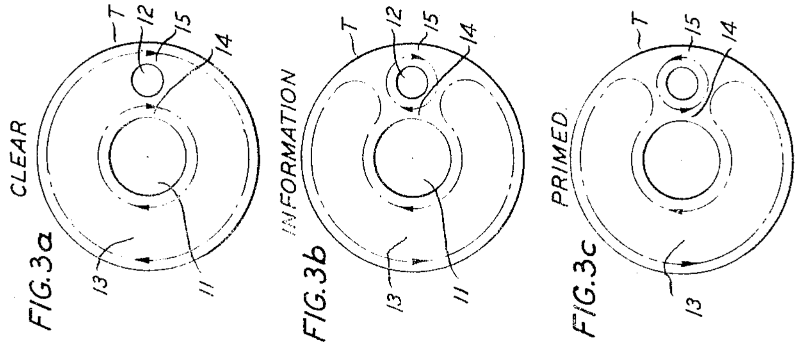
Figure 2:
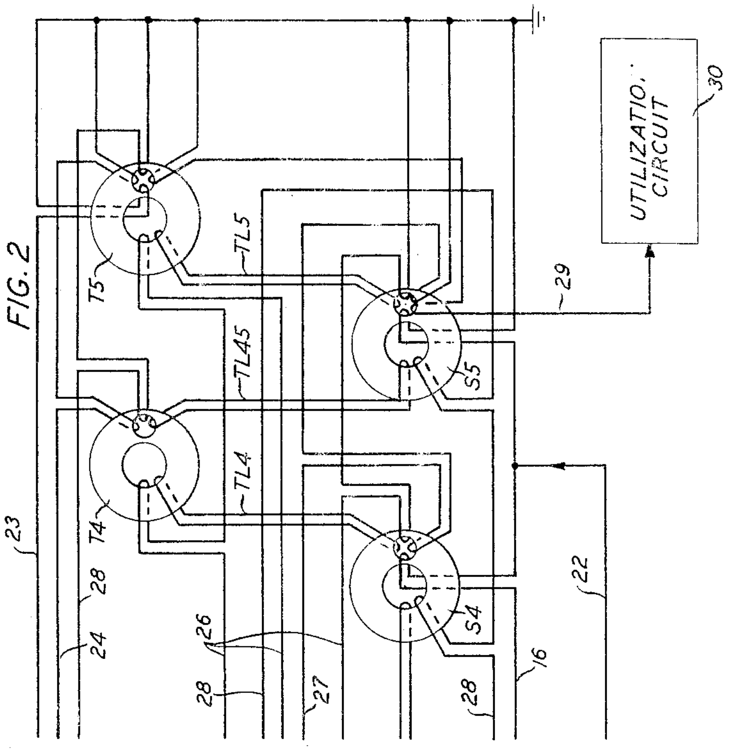

A complete understanding of the present invention together with the objects and features thereof can be gained by a consideration of the following detailed description taken in conjunction with the accompanying drawing in which:

FIGS. 1 and 2 together illustrates schematically an illustrative embodiment of this invention;

FIGS. 3*a*, 3*b*, and 3*c* depict schematically the possible magnetic conditions to which the cores of the embodiment of FIGS. 1 and 2 are driven during operation of the embodiment of FIGS. 1 and 2; and FIG. 4 depicts, graphically, the correspondence between the number values on the various buttons of a pushbutton telephone useful in cooperation with the pulse generator of FIGS. 1 and 2, showing the relationship between the button depressed and the corresponding voltages applied to the illustrative embodiment of FIGS. 1 and 2 in response thereto.

An illustrative pulse generator 10 capable of translating coded input information or, in other words, current signals to output pulses in accordance with this invention is shown in FIGS. 1 and 2 of the drawing viewed side by side in a manner made obvious by the identical marking of common conductors therein. The pulse generator comprises a shift register including an alternating series of multiapertured magnetic storage cores S1, S2, . . . S5, and multiapertured magnetic transfer cores T1, T2, . . . T5. A pair of adjacent cores bearing corresponding numeral designations are commonly thought of as constituting a stage of the shift register. The magnetic cores are advantageously of a well known ferrite material exhibiting a substantially rectangular hysteresis characteristic which is capable of remaining in either of two conditions of magnetic remanence to which switched by an applied magnetomotive force.

Each magnetic core includes a single central aperture 11 and a smaller aperture 12 which define legs 13, 14 and 15. Legs 14 and 15 have substantially equal minimum cross-sectional areas; leg 13 has a minimum cross-sectional area equal to about twice that of either leg 14 or 15. All the magnetic cores are assumed herein to be substantially identical, and, accordingly, the apertures and legs are designated only in connection with core T1.

A conductor 16, coupling serially, in the same sense, the leg 14 of each of the storage cores S1, S2, . . . S5, consecutively, is connected between an input pulse source 17, via a tap, or, in other words, conductor 18 and ground. A plurality of conductors 19, 20, 21, and 22 are connected at one end to the input pulse source 17 and at the other end to the conductor 16 between the cores S1 and S2, S2 and S3, S3 and S4, and S4 and S5, respectively. A conductor 23, coupling the leg 14 of transfer core T5, is connected between input pulse source 17 and ground.

A conductor 24, coupling serially, in the same sense, the legs 15 of the transfer cores T1, T2, . . . T5, consecutively, is connected between a clock pulse source 25 and ground. A conductor 26, coupling serially, in a first sense, the legs 13 of the transfer cores T1, T2, . . . T5, consecutively, and, in a second sense, the legs 15 of the storage cores S1, S2, . . . S5, is connected between clock pulse source 25 and ground. A conductor 27, coupling serially, in the same sense, legs 15 of storage cores S1, S2, . . . S5, is connected between clock pulse source 25 and ground. A conductor 28, coupling serially, in a first sense, legs 13 of the storage cores S1, S2, . . . S5, consecutively, and, in a second sense, the legs 15 of the transfer cores T1, T2, . . . T5, is connected between clock pulse source 25 and ground. Each of a first plurality of transfer loops, TL1, TL2, . . . TL5 couples the leg 15 of a storage core to the leg 13 of the transfer core of the same stage of the shift register. The transfer loops bear numeral designations corresponding to those of the cores so coupled. Each of a second plurality of transfer loops TL12, TL23, TL34, and TL45 couples the leg 15 of a transfer core to the leg 13 of the storage core of the next succeeding stage of the shift register. These transfer loops include two numerals corresponding to those of the cores coupled thereby. The transfer loops, advantageously, contain no other electrical elements and only the properties inherent in the loops, such as the internal resistance, will have any effect on the currents in the loops. A conductor 29, coupling serially, in the same sense, the transfer core 25 and the storage core S5 of the terminal stage of the register, is connected between utilization circuit 30 and ground. Input pulse source 17 and clock pulse source 25 are connected to control circuit 31 by means of conductors 32 and 33, respectively.

In operation, the magnetic flux in the various cores of the pulse generator of FIGS. 1 and 2 is driven into differerent configurations. FIGS. 3*a*, 3*b*, and 3*c* show a representative one of such cores designated T for convenience. The core T is representative of each core in the register because all the cores are here assumed to be identical. Each leg 14 and 15 of the core T includes an arrow as shown in the figure. The arrow represents the direction of flux and the flux capacity of the leg. Since all the legs 14 and 15 have equal minimum cross-sectional areas, as indicated hereinbefore, they have equal flux carrying capacities, and, accordingly, one arrow is shown in each leg. Each arrow may be thought of, conveniently, as representing a single unit of flux. The leg 13 which has twice the minimum cross-sectional area of leg 14 or leg 15 is shown as including two arrows. The direction of an arrow, that is, upward or downward as viewed in the drawing with respect to the legs, indicates the two remanant states for the leg designated. When all the flux in legs 13, 14, and 15 is in a clockwise direction about aperture 11, that is, when the arrows in legs 13 are directed upward, and the arrows in legs 14 and 15 are directed downward, the core is said to be in the clear state which is shown in FIG. 3*a*. When one arrow in leg 13 and the arrow in leg 14 are directed upward, and one arrow in leg 13 and the arrow in leg 15 are directed downward, the cord is said to be in the information state, which is shown in FIG. 3*b*. When one arrow in leg 13 and the arrow in leg 15 are directed upward, and one arrow in leg 13 and the arrow in leg 14 are directed downward, the core is said to be in the primed state which is shown in FIG. 3*c*.

For a full understanding of the following description of the illustrative operation of the pulse generator of FIGS. 1 and 2, it will be helpful to indicate the correspondence between the number values on the various buttons of a pushbutton telephone which may serve as the origin of the coded input currents applied to the pulse generator of FIGS. 1 and 2. A graphic representation of such a correspondence is shown in FIG. 4 and is understood to include a plurality of buttons each bearing a digit designation from 1 to 10, where a "0" represents the digit "10." The buttons are arranged to illustrate the correspondence to the particular code used in the illustrative operation and are not intended, necessarily, to illustrate the physical appearance of the face plate of any telephone apparatus. In response to the depression of a button, one or two current pulses in accordance with a predetermined code are applied by means of input pulse source 17 shown in FIG. 1 to the pulse generator of FIGS. 1 and 2. The current pulses corresponding to the individual buttons are shown in FIG. 4. The relation between the button depressed, the currents applied in response thereto to the pulse generator of FIGS. 1 and 2, the cores driven to an information state in response to the applied currents, and the number of output pulses realized is summarized in Table I and will be referred to in the description of the illustrative operation.

TABLE I

| Button Depressed | Currents Applied | Cores in the Information State | Number of Output Pulses |
|---|---|---|---|
| 1 | I1 | T5 | 1 |
| 2 | H1 | S5 | 2 |
| 3 | H1 and I1 | S5 and T5 | 3 |
| 4 | H2 | S4 and S5 | 4 |
| 5 | H2 and I1 | S4, S5, and T5 | 5 |
| 6 | H3 | S3, S4, and S5 | 6 |
| 7 | H3 and I1 | S3, S4, S5, and T5 | 7 |
| 8 | H4 | S2, S3, S4, and S5 | 8 |
| 9 | H4 and I1 | S2, S3, S4, S5, and T5 | 9 |
| 0 | H5 | S1, S2, S3, S4, and S5 | 10 |

In light of the foregoing description of the organization of the pulse generator of FIGS. 1 and 2, and the remarks concerning one possible origin of the coded input, and information representation in the pulse generator in accordance with this invention, a description of an illustrative operation thereof will now be presented. In order to expedite the description, it is assumed that all the cores in the pulse generator of FIGS. 1 and 2 are initially in the clear state shown in FIG. 3*a*. The operation of the pulse generator will be specifically described for three exemplary current codes applied to the pulse generator, producing, one, five and eight output pulses in response thereto. These current codes are I1, H2 and I1, and H4, and, conveniently, correspond to the buttons 1, 5 and 8 as shown in FIG. 4.

An operation, in accordance with this invention, is initiated by activating the input pulse source 17 under the control of control circuit 31 to apply to the pulse generator 10 to FIGS. 1 and 2 a coded input signal comprising one or two currents from the set of six currents designated H1, H2, H3, H4, H5, and I1. Since the pulse source 17 applies one or two currents out of a possible six currents to the pulse generator, the input therefrom is termed a "one or two-out-of-six code" (1 or 2)/(6). In this connectioin, pulse source 17 may be any pulse source capable of supplying pulses of a duration and amplitude sufficient to drive to an information state the various cores of the pulse generator of FIGS. 1 and 2 in accordance with this invention. One such pulse source may be a word-organized "fluxor" memory of the type described in Patent No. 2,926,342, of J. L. Rogers, issued Feb. 23, 1960, including the usual output amplifiers. The control circuit 31, in this connection, may be any control circuit capable of activating the pulse source 17 and clock pulse source 25 in accordance with this invention. In accordance with the assumed illustrative operation, input pulse source 17 under the control of control circuit 31 applies current I1 to conductor 23. The various currents, for simplicity, will be assumed to be in positive direction and of equal amplitude and duration for the purposes of the illustrative operation. A current I1 applied to conductor 23 tends to drive upward the flux in leg 14 of transfer core T5. All the transfer cores are in the clear state with the flux in their legs 14 directed downward. Accordingly, in response to the positive current I1 applied to conductor 23, the flux in leg 14 of core T5 is driven upward. Flux closure for the switched flux in leg 14 of transfer core T5 is via leg 13, the flux pattern being set to the information state as shown in FIG. 3*b*. The information, now set in the register, is stepped out serially in response to a four-phase cycle of operation as follows: Clock pulse source 25 is activated under the control of control circuit 31 for providing alternating prime and advance pulses designated P1, A1, P2, and A2 for stepping the information through the series of cores. In this connection, clock pulse source 25 may be any source of pulses capable of providing prime and advance pulses in accordance with this invention. The pulse P1 is applied to conductor 24 driving upward the flux in the leg 15 of each of the transfer cores T1, T2, . . . T5. The prime pulse, however, has an amplitude insufficient to switch about the central aperture 11 of a core. Accordingly, flux closure for flux driven in a leg 15 of a core in response to the prime pulse P1 is by means of leg 14. The flux in leg 14 of the transfer cores T1, T2, . . . T4 already is directed downward and cannot provide the requisite flux closure. Thus, in response to the prime pulse P1, no significant flux changes occur in transfer transfluxors T1, T2, . . . T4, and these cores remain in the clear state. Transfer core T5, however, is in the information state. In response to the prime pulse P1, the flux state of core T5 is changed to the primed state; only an insignificant output pulse is induced in conductor 29 in response to the pulse P1 because of the duration and amplitude of pulse P1, as is well known.

The second pulse A1 applied to conductor 26 under the control of control circuit 31 drives upward the flux in legs 13 of the transfer cores T1, T2, . . . T5 and drives downward the flux in the legs 15 of the storage cores S1, S2, . . . S5. The transfer cores T1, T2, . . . T4 are in the clear state, and, accordingly, their legs 13 are already saturated in the direction urged by the advance pulse A1; no significant flux change results. Similarly, the storage cores S1, S2, . . . S5 also are in the clear state, and, accordingly, no significant flux change results therein in response to the advance pulse A1. The transfer core T5, however, is in the primed state. In response to the advance pulse A1, the flux in leg 13 is driven upward driving core T5 to the clear state, switching the flux in leg 15 thereof in the process. The switching of flux in leg 15 of transfer core T5 induces a negative pulse in the output conductor 29 for activating utilization circuit 30. In this connection, utilization circuit 30 may be any circuit capable of using one or more unipolar (negative) output pulses in accordance with this invention; reversal of the winding sense, however, would enable use of positive output pulses and any correspondingly adapted utilization circuit, as is well known. The utilization circuit, conveniently, has a sufficiently high impedance to reduce the current flowing in the output conductor, in response to the switching of a core coupled thereby, to below the level necessary to effect flux switching in the other cores coupled thereby. For telephone applications, the utilization circuit may be, for example, a univibrator triggered by the unipolar output pulses in accordance with this invention and providing, in response thereto, dial pulses having a break and make ratio compatible with, for example, a step-by-step central office. The foregoing description demonstrates that a particular current, which may advantageously correspond to the odd number one as shown in FIG. 4, when applied to the circuit of FIGS. 1 and 2 results in a single output pulse. The operation and results therefrom in response to other applied currents which may correspond to the odd number five as shown in FIG. 4 will now be described.

It is to be noted that the prime and advance pulses are repeated until all the storage and transfer cores are in the clear state; then additional information may be introduced. The introduction of information and the provision of the requisite number of prime and advance pulses is under the control of control circuit 31.

Input pulse source 17 is again activated under the control of control circuit 31 for applying current H2 to conductor 16 by means of conductor 21, and for applying, simultaneously, current I1 to conductor 23. Current H2 tends to drive upward the flux in legs 14 of storage cores S4 and S5. Cores S4 and S5 are in the clear state, and the magnetic flux in their legs 14 is directed downward. Consequently, flux switching in legs 14 of cores S4 and S5 results in response to the current H2, flux closure being provided through leg 13 driving the cores to the information state. Current I1 applied to conductor 23 tends to drive the flux in legs 14 of transfer core T5 upward. Since this core is in the clear state, the flux in its legs 14 switches, flux closure being provided through leg driving the core to the information state. Thus, in response to the applied current pair H2 and I1, cores T5, S4, and S5 are driven to the information state.

The sequences of prime and advance pulses are applied as before in response to the activation of clock pulse source 25 under the control of control circuit 31. In response to the pulse P1, the flux in leg 15 of core T5 is driven upward, flux closure being provided through leg 14; core T5, accordingly, is driven to the primed state. In response to the pulse A1, the flux in leg 13 of core T5 is driven upward, flux closure being provided through leg 15 driving the core to the clear state. The switching downward of flux in leg 15 in response to pulse A1 induces a first output pulse in conductor 29 for activating utilization circuit 30. In response to pulses P2 and A2, cores S4 and S5 undergo the flux changes, described for core T5 immediately hereinbefore. In switching, leg 15 of core S5 induces a second pulse in conductor 29. Also, legs 15 of cores S4 and S5, in switching from the primed state to the clear state, induce pulses in transfer loops TL4 and TL5 which drive the transfer cores T4 and T5, respectively, to the information state. In this connection, the various transfer loops have a 2:1 turns ratio to compensate for transfer losses and to insure complete switching during the advance phases as is well known. In response to the next sequence of P1 and A1 pulses, core T5 induces a third pulse in conductor 29. The flux in leg 15 of core T4, in switching from a primed state to the clear state, induces a pulse in transfer loop TL45 for driving storage core S5 to the information state. In response to the next sequence of P2 and A2 pulses, core S5 switches as described above, inducing a fourth pulse in conductor 29 and, simultaneously, driving core T5, via transfer loop TL5, to the information state. In response to the next sequence of P1 and A1 pulses, core T5 switches to the primed state and to the clear state, sequentially, inducing, in the process, a fifth pulse in conductor 29. In response to additional prime and advance pulses, no further pulses are induced in output conductor 29 because the cores are in the clear state and thus experience only insignificant shuttle flux changes in response to such pulses. Therefore, the currents H2 and I1 produce five output pulses in conductor 29 as is indicated in Table I.

The current H4 applied, as described hereinbefore, to conductor 16, via conductor 19, drives storage cores S2, S3, S4, and S5 to the information state; the remaining cores are not coupled by the active circuit, and, accordingly, are unaffected. In response to successive pulses P1 and A1, P2 and A2, P1 and A1, et cetera, the transfer cores are first driven to the clear state (they already are in the clear state in this instance) and information is then stepped alternately from the storage cores to the transfer cores in the manner described, producing an output pulse each time core S5 or core T5 is driven to the clear state; eight pulses are induced in conductor 29.

It is, thus, clear that for each storage core driven to the information state, two pulses are induced in the output conductor in response to the prime and advance sequences. Therefore, $n/2$ of the storage cores are so driven for a current to produce an even number of, for example, $n$ output pulses. Also, for a current pair to produce an odd number of output pulses, for example, $n+1$, where $n=0, 2, 4, 6$, and 8, $n/2$ of the storage cores are driven to the information state along with the transfer core T5. In response to the prime and advance sequences, the terminal transfer core produces a single output pulse; the terminal storage core not only produces a single output pulse but also enables the terminal transfer core to produce an additional pulse. The sequences of pulses are induced in an output conductor which couples only these two cores of the register.

Each of the yet undiscussed currents H1, H3, and H5 are applied individually by input pulse source 17 under the control of control circuit 31 to conductors 22, 20, and 18 to drive to the information state cores S5, and S3, S4, and S5, and S1, S2, S3, S4, and S5, respectively; the even numbers of output pulses 2, 6, and 10 are enabled. The currents H1 and H3 individually applied simultaneously with current I1 correspond to the odd number of three and seven output pulses, respectively. Additional stages may be added by one skilled in the art for obtaining additional numbers of output pulses and/or for building into the pulse generator additional functions not a part of this invention.

The operation has been described in terms of the application of three coded input signals to illustrate the unique operation of the pulse generator of FIGS. 1 and 2. In each instance, after the application of a coded input signal, the cores in the pulse generator are returned to the clear state by the prime and advance sequences prior to the introduction of the next coded input signal. For applications employing pushbutton telephones, the normal sequence of seven coded input signals corresponding to seven digits (for local dialing) are applied to the pulse generator. In response to each signal, information is stored as described, and, subsequently, read out serially as output pulses in response to the prime and advance sequences which return all the cores to the clear state in preparation for the next succeeding signal. Interdigit timing and the initiation of successive read-out cycles may be controlled by conventional means conveniently comprising a portion of control circuit 31. One such means is disclosed in the aforementioned Hohmann patent.

Although the invention has been described in terms of a multiapertured magnetic element, any bistable element may be used. In addition, although the invention has been described in terms of a shift register including a storage and a transfer core per stage, any shift register having parallel-to-series capabilities may be used. Moreover, the particular code employed in the illustrative embodiment is but exemplary; other codes may be utilized in accordance with this invention with minor modifications of the input circuit to set the proper number of storage cores.

What has been thus described is considered to be only an illustrative embodiment of this invention. Accordingly, various and numerous other arrangements may be devised by one skilled in the art without departing from the spirit and scope of this invention.

What is claimed is:

1. An electrical circuit comprising plurality of first elements, and a second element, said elements being arranged consecutively and having first and second stable states, first input circuit means for selectively setting $n/2$ of said first elements to said first stable state in response to a coded signal corresponding to an even number in a second input circuit means for selectively setting $n/2$ of said first elements and said second element to said first stable state in response to a coded signal corresponding to an odd number $n+1$, and signal means connected to each of said input circuit means for applying coded signals thereto.

2. An electrical circuit as claimed in claim 1 also comprising means for switching each of said elements to said second stable state, and output circuit means coupled to the terminal first element and said second element for generating an output signal responsive to said switching of either of said last mentioned elements.

3. In combination, a shift register including a series of alternating first and second elements, each of said first and second elements having first and second stable states, and also including means for alternately resetting to said second stable state said first elements and said second elements, and means responsive to said resetting for setting to said first stable state the corresponding next succeeding elements, input circuit means coupling all of said first elements and the terminal second element for setting to said first stable state $n/2$ of said first elements in response to a coded signal corresponding to an even number $n$ and for setting to said first stable state $n/2$ of said first elements and said terminal second element in response to a coded signal corresponding to an odd number $n+1$, signal means connected to said input circuit means for applying a coded signal thereto, and output circuit means coupling the terminal first element and said terminal second element for providing an output pulse in response to the resetting to said second stable state of either of the last mentioned elements.

4. In combination, a multistage shift register including a first and second element per stage, each of said first and second elements having first and second stable states, input circuit means coupling said first elements and the second element of the terminal stage of the register in a manner to selectively set to a first stable state $n/2$ of said first elements in response to a coded signal corresponding to an even number $n$, and to selectively set to said first stable state $n/2$ of said first elements and said second element of said terminal stage in response to a coded signal corresponding to an odd number $n+1$, signal means connected to said input circuit means for applying a coded signal thereto, means coupling the first and second elements of each stage for setting to said first stable state the so coupled second elements in response to the resetting to said second stable state of the corresponding first elements, means coupling the second elements of each stage with the first elements of the corresponding next adjacent stage for setting to said first stable state the so coupled first elements in response to the resetting to said second stable state of the corresponding second elements, signal means coupling said first and second elements for alternatingly resetting to said second stable state said first and second elements, and output means coupling the first and second elements of said terminal stage for providing an output in response to the resetting to said second stable state of either of the last mentioned elements.

5. A combination in accordance with claim 4 in which said first and second elements are magnetic cores.

References Cited by the Examiner

UNITED STATES PATENTS

| | | | |
|---|---|---|---|
| 3,046,351 | 7/1962 | Bennett et al. | 340—347 |
| 3,130,398 | 4/1964 | Freedman | 340—347 |

MAYNARD R. WILBUR, *Primary Examiner.*

K. R. STEVENS, W. J. KOPACZ, *Assistant Examiners.*